May 25, 1954 R. A. HAWN ET AL 2,679,400
APPARATUS FOR HOLDING WORKPIECES IN MACHINE TOOLS
Filed Dec. 2, 1948 2 Sheets-Sheet 1

INVENTORS,
RALPH A. HAWN
JOHN H. ENGELN
BY Jay, Gobrick & Jay
ATTORNEYS

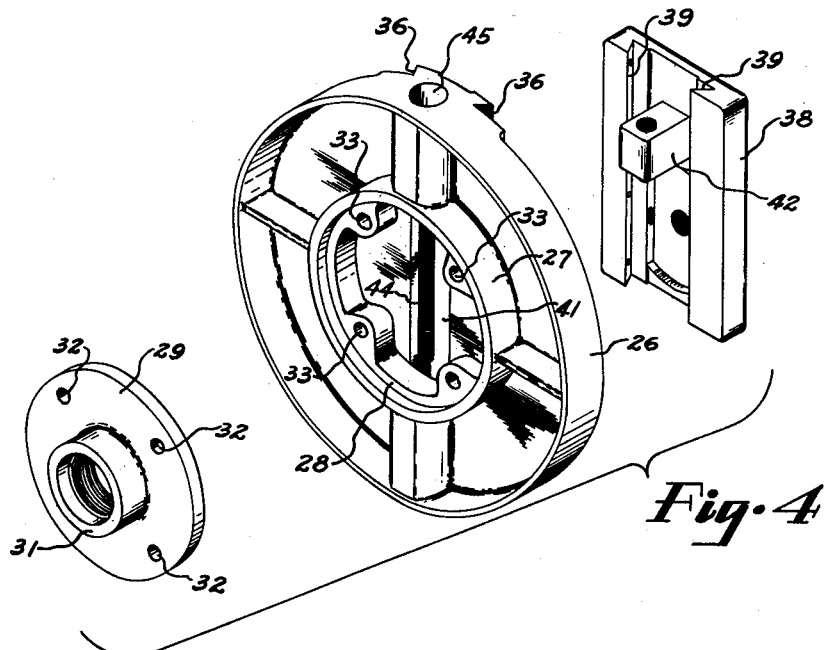

Patented May 25, 1954

2,679,400

UNITED STATES PATENT OFFICE 2,679,400

APPARATUS FOR HOLDING WORKPIECES IN MACHINE TOOLS

Ralph A. Hawn and John H. Engeln, Cleveland, Ohio; said Engeln assignor to said Hawn Application December 2, 1948, Serial No. 63,056

2 Claims. (Cl. 279—6)

The present invention relates to machine tool work holders and more particularly to apparatus for holding pieces to be successively machined on two or more machine tools.

An object of the present invention is to provide apparatus for handling work pieces to be machined by two or more machine tools so that the usual manual work involved in "setting up" or properly positioning the pieces in the machines may be greatly reduced without sacrifice of accuracy.

Another object of the invention is to provide apparatus by which a work piece may be positioned in a plurality of machine tools quickly and accurately, and which affords wide flexibility in the position of the piece relative to the cutting elements of the machine tools.

Other objects and advantages of the invention will be apparent from the following description of a preferred form of the invention, reference being made to the accompanying drawings, wherein:

Fig. 4 is an exploded view of an adjustable adapter plate;

Fig. 5 is a front view in elevation of the adapter plate shown in Fig. 4;

Fig. 6 is a sectional view taken on line 6—6 of Fig. 5;

Fig. 10 is a perspective view of another form of adapter plate with a portion cut away.

In machine shop work it is common to perform metal removing operations on a piece of work by a number of different machine tools by successive operations. For example, the piece may have a part turned on a lathe, a hole drilled thereon on the lathe or on a drill press, one or more slots or lands cut by a milling machine, and surfaces ground by a grinder. In each operation by the various machine tools mentioned, and by still others not mentioned here, it has heretofore been necessary to clamp the piece to a work holder associated with each machine tool and where any sort of accuracy is involved it was necessary to expend considerable time in positioning the piece in the work holder so that the proper precise machining operation could be performed. Our invention is directed to a method and apparatus by which the work pieces can be attached to a holder or bracket which is provided with a connector structure by which the holder can be readily and precisely attached to an adapter member affixed to the various machine tools. Thus, after the adapter members are affixed to the machines by precise arrangement thereon, successive operations may then be performed by merely affixing the work holder to the adapters by a clamp means.

Figure 1:
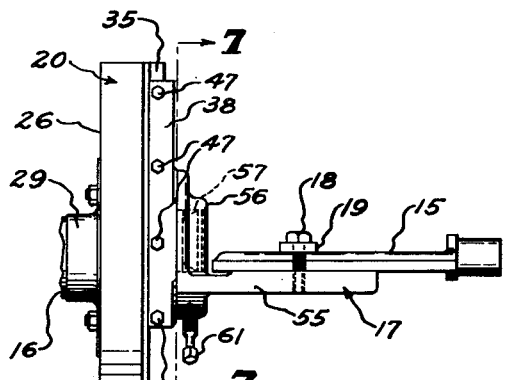
Fig. 1 is a view in elevation of a work piece mounted to a lathe.
Figure 2:
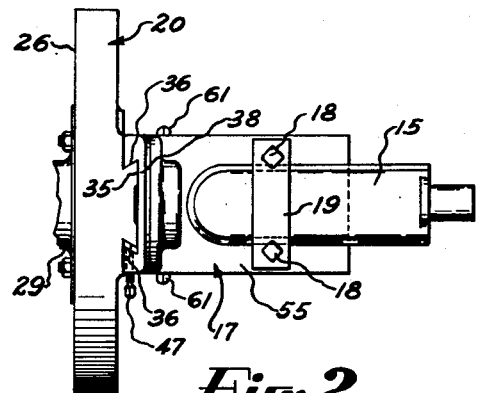
Fig. 2 is a plan view of the subject of Fig. 1.
Figure 3:
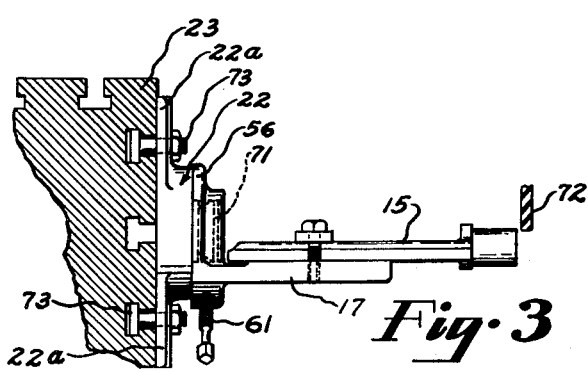
Fig. 3 is a fragmentary view of a milling machine and the work piece shown in Figs. 1 and 2 mounted therein.

Referring now to the drawings in Figs. 1 and 2, we have shown a work piece 15 attached to the spindle 16 of a lathe. The piece 15 is clamped to a bracket or holder 17 by bolts 18 and a clamp strap 19. The holder 17 is attached to an adjustable adapter or base plate 20 mounted on the lathe spindle. In Fig. 3, the member 15 is shown mounted on the bed of a milling machine and it is still attached to holder 17 but holder 17 is attached to an adapter plate 22 mounted to the bed 23 of the milling machine instead of to plate 20. In changing the work piece from the lathe to the milling machine, it is only necessary to detach the work holder from plate 20 and attach it to plate 22, which, as will be apparent hereinafter, is a relatively quick and simple operation.

Referring now to Figs. 1, 2, and 4 to 6, the adapter plate 20 is shown comprising a circular flanged member 26 having an annular flange structure 27 centrally located on one surface thereof and this structure includes an annular shoulder 28 for receiving an adapter base. One adapter base is shown at 29 and it consists of a circular plate formation having an internally threaded hub or neck 31. The plate formation abuts the shoulder 28 and is bolted thereto by bolts extending through openings 32 in the plate and openings 33 in the shoulder 28. The neck 31 of the adapter base 29 is adapted to be threaded on the spindle of a lathe, for example, for mounting the plate 20 to the latter. The plate 20 may, however, be mounted on other forms of machine tools by different adapter bases, one of which is described hereinafter. The face of the plate 26 opposite to that to which the adapter base is attached has a slideway 35 formed thereon which consists of a ridge extending transversely of the face and having undercut side edges or guideways 36. The slideway is adapted to receive a carriage 38 which may be adjustably positioned along the slideway. The carriage is rectangular in form and it has a channel adapted to receive the ridge and the sides of the channel are undercut at 39 to correspond to the sides 36 for cooperation with the latter to hold the carriage to the plate. The plate 26 has a slotted opening 41 intermediate the ends of the ridge and a lug 42 formed on carriage 38 projects into the slot. A threaded rod 44 is rotatably mounted in a radial bore 45 in the peripheral portion of the plate and the rod extends axially of the slotted opening 41 and is threaded in an opening through lug 42. The rod is provided with a head 44a which abuts the shoulder formed by a reduced diameter of the bore 45 and the head has an octagonal recess for receiving a wrench by which the rod may be rotated. The head 44a is held in the bore 45 by a sleeve 46 pressed in the bore. By turning the rod 44, the carriage 38 may be accurately positioned along the ridge. Preferably, the carriage may be tightly locked to the slideway by a series of set screws 47 threaded through the openings in the sides thereof.

The carriage 38 has a plate 48 attached thereto by a screw 49 and a boss 50 is formed on the plate 48. The boss 50 is circular and is undercut to form an annular shoulder 51. The outer face of the boss is flat and the boss has a threaded opening 52 formed therethrough, the axis of which opening is normal to the outer face. The purpose of the threaded opening will appear hereinafter.

The lug 50 serves as a connector structure by which a work holder, such as that shown at 17, may be attached to the adapter base 20. The holder 17, which is only one form of many forms which might be used, is L shaped, comprising a flat section 55 to which certain forms of work pieces may be clamped and a foot part 56 extending at right angles to the section 55. The foot 56 has a bore 57 therethrough which is adapted to receive the boss or lug 50 therein with a precision fit. Two angularly spaced threaded openings 58 and 59 extend through the walls of the foot and radial to the axis of the bore 57 and these openings each carry pins 60 having a sloping end surface which is complementary to the undercut portion of the boss 50. Bolts 61 are threaded in openings 58 and 59 and are adapted to press the pins to the boss for clamping the holder firmly to the boss. It will be observed that the holder may be positioned at any angle relative to the boss and locked in the desired position. This adjustment together with the adjustable positioning of the carriage 38 affords a quick and accurate method of positioning the work piece relative to the metal cutting element. This feature is particularly useful, for example, where it is desirable to bore an opening in the work piece by a lathe which opening is eccentric to the turned diameter of a part of the work piece. This may be accomplished by shifting the carriage 38 relative to the axis of the lathe spindle the desired amount. It will be understood that other work holders may be provided of suitable shapes to hold various shapes of work pieces and each having connector structures which are complementary to boss 50 similar to the bore 57, pins 60 and bolts 61.

Figure 9:
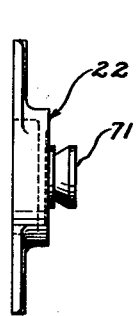
Figs. 8 and 9 are front and side views, respectively, of an adapter plate.
Figure 8:
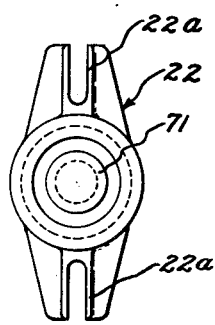
Figure 7:
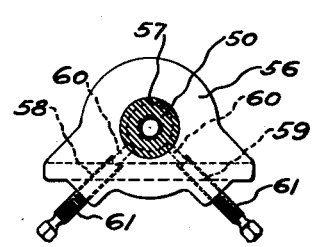
Fig. 7 is a view in section taken on line 7—7 of Fig. 1.

Referring now to Figs. 3, 8 and 9. We have shown the adapter or base plate 22 which may be used in place of plate 20 on certain types of machine tools. This adapter has a central portion having a boss formation 71, which is similar in all respects to boss 50. The adapter 22 is attachable to a suitable bed by slotted lugs 22a extending from opposite sides. In Fig. 3, we have shown the holder 17 attached to the adapter 22 which is in turn attached to the bed 23 of a milling machine, a portion of the cutter of which is shown at 72, by bolts 73.

It may be desirable in some cases to mount base plate 20 on the bed of a milling machine, and for this purpose, we have provided an adapter base 75, shown in Fig. 10, which may be substituted for the adapter 22. The adapter 75 has a base portion 76 with slotted openings 77 to receive bolts for attaching the base to the bed of a machine tool. A circular boss 78 is formed thereon which is adapted to fit into the flange structure 27 of the plate 20 and abut the shoulder 28. Openings 79 receive bolts, not shown, which are threaded in openings 33 for attaching the adapter base to the plate. By use of the adapter 75, the work may be easily adjusted relative to the cutting tool by attaching the plate 20 to the adapter with the slots 77 extending normal to the slideway on plate 26. Thus, adjustment may be effected in any direction in the plane of the machine bed.

Figure 11:
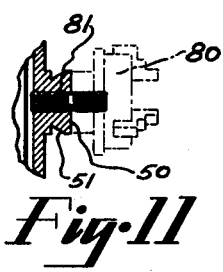
Fig. 11 is a fragmentary sectional view of the adjustable adapter plate with a chuck mounted thereto.

In Fig. 11 we have shown a work holder in the form of a chuck 80 for gripping rod stock, and it is connected to the boss 50 by a threaded rod 81 which is threaded into the opening 52 and one face of the chuck abuts the outer face of the boss. By our invention, a work piece can be attached to a holder and the holder then attached to the adapter plates mounted on the different machine tools on which the work piece is to be machined. A few adapter plates of varying forms may be employed and will be suitable for use with many different machine tools. The work holders may be more numerous in design to suit the shape of the piece to be held. Since in most instances the piece need not be removed from the holder and the holder is connectable in a definite relation to the respective adapters on the machine tools, the machined portions of the piece can be more readily maintained in accurate relationships to one another. Furthermore, the number of tool fixtures required for any given sequence of machining operations may be reduced by use of our invention.

Although we have described but one form of the invention, other forms might be adopted, all falling within the scope of the claims which follow.

We claim:

1. A work holder device comprising a base attachable to a machine tool, said base having a slideway formed thereon extending transversely of the base; a carriage slidably mounted on said slideway; adjustable means for positioning the carriage along the slideway; a work holding bracket adapted to be removably attached to said carriage; a circular lug projecting from the carriage, said bracket having a circular opening for closely receiving the lug; and a lock screw in the bracket for engaging the lug to lock the lug in the opening.

2. A work holder device comprising, a base attachable to a machine tool, said base having a slideway formed thereon extending transversely of the base; a carriage slidably mounted on said slideway; adjustable means for positioning the carriage along the slideway; a work holding bracket adapted to be removably attached to said carriage; a circular lug projecting from the carriage, said lug having an undercut portion adjacent the outer end thereof, said bracket having a circular opening for closely receiving the lug; and a lock screw in the bracket for engaging the lug at the undercut portion thereof to lock the lug in the opening.

References Cited in the file of this patent

UNITED STATES PATENTS

| Number | Name | Date |
| --- | --- | --- |
| 1,133,169 | Morris | Mar. 23, 1914 |
| 1,439,190 | Pritchard | Dec. 19, 1922 |
| 1,743,116 | Cook | Jan. 14, 1930 |
| 1,751,662 | Schupp | Mar. 25, 1930 |
| 1,754,630 | Klamp et al. | Apr. 15, 1930 |